United States Patent [19]
Farrington et al.

[11] Patent Number: 5,794,076
[45] Date of Patent: Aug. 11, 1998

[54] METHOD AND APPARATUS FOR CONTROLLING EXPOSURE

[75] Inventors: David L. Farrington, Boxboro; A. Brian Holland, Wayland; Thomas A. Lumenello, Westford; Jane L. Riemenschneider, Wellesley, all of Mass.

[73] Assignee: Polaroid Corporation, Cambridge, Mass.

[21] Appl. No.: 577,481

[22] Filed: Dec. 22, 1995

[51] Int. Cl.⁶ .......... G03B 17/08; G03B 17/50; G03B 3/00; G03B 15/03
[52] U.S. Cl. ............. 396/25; 396/27; 396/28; 396/30; 396/98; 396/157
[58] Field of Search ............. 354/64; 396/25, 396/27, 28, 29, 30, 98, 108, 157

[56] References Cited

U.S. PATENT DOCUMENTS

| | | | |
|---|---|---|---|
| 3,942,183 | 3/1976 | Whiteside | 354/29 |
| 4,381,144 | 4/1983 | Breslau | 354/64 |
| 4,447,896 | 5/1984 | Rines | 367/96 |
| 4,542,959 | 9/1985 | Kreutzig | 350/311 |
| 4,799,077 | 1/1989 | Kaplan et al. | 354/400 |
| 4,999,664 | 3/1991 | Foust | 354/446 |
| 5,014,082 | 5/1991 | Farrington | 354/437 |
| 5,142,299 | 8/1992 | Braun | 354/64 |
| 5,151,728 | 9/1992 | Hendry et al. | 354/83 |
| 5,438,366 | 8/1995 | Ejima et al. | 348/223 |
| 5,546,156 | 8/1996 | McIntyre | 354/400 |
| 5,708,860 | 1/1998 | Nonaka et al. | 396/28 |

OTHER PUBLICATIONS

A brochure entitled Polaroid marine, Published by Polaroid Corporation, 4 pages, Aug. 1994.
A brochure entitled Polaroid marine, dated 1994–Aug. 1, published by Polaroid Corporation, p. 4.

*Primary Examiner*—Safet Metjahic
*Assistant Examiner*—Christopher E. Mahoney
*Attorney, Agent, or Firm*—Leslie Payne

[57] ABSTRACT

There is disclosed a photographic system incorporating a photographic apparatus of the type including an exposure control system which senses and evaluates ambient and infrared spectral energy for controlling camera functions; as well as an accessory for use in combination therewith which compensates for attenuation of infrared energy underwater which infrared energy would otherwise be used in controlling the camera functions. Provision is made for a supplemental source of infrared energy that is directed to such system for a time period and in an amount based upon an evaluation of reflected visible spectral energy from the scene.

10 Claims, 6 Drawing Sheets

METHOD AND APPARATUS FOR CONTROLLING EXPOSURE

BACKGROUND OF THE INVENTION

The present invention relates generally to photographic methods and apparatus and, more particularly, to improved photographic apparatus and methods useful for underwater photography.

Typical underwater photography uses a conventional photographic camera housed in a suitable underwater housing. However, this general approach is disadvantageous in that the photographer is uncertain if the photograph of the marine scene has been properly taken until after leaving the marine environment. A notable improvement is, of course, the use of instant developing type cameras whereby the photographer obtains and evaluates the photographic results immediately and can make another exposure if necessary. Commonly assigned U.S. Pat. No. : 5,151,728 describes such a camera which is particularly well adapted for use in underwater photography because it includes a self-contained storage compartment having a window for conveniently viewing film units successively entering the viewing compartment from a camera exit slot. This camera is housed in a suitable waterproof housing assembly which housing has at least windows permitting exposure of the film unit as well as viewing of the developed film unit.

While this particular type of camera has performed successfully, it has been determined that there is a tendency for overexposing and improper focusing some of the scenes. Efforts have been made to overcome this drawback. One known attempt utilizes a manually operated lens and filter assembly rotatably mounted on the underwater housing. The assembly carries a series of neutral density filters and a series of different diopter lenses that are respectively moved into and out of overlying positions relative to the flash apparatus and camera taking lens in response to manual rotation thereof. However, this approach has not proven entirely successful in eliminating overexposure and improper focusing.

SUMMARY OF THE INVENTION

The present invention proposes improved photographic methods and apparatus for overcoming the aforenoted shortcomings of the prior art in taking underwater exposures. In this regard, one preferred method of exposing film underwater using a photographic apparatus of the self-developing type having a source of artificial illumination and an exposure control mechanism including an infrared sensing means; comprises the steps of: initiating an exposure cycle; evaluating the reflected scene rightness of a pulse of artificial illumination at least prior to completion of an exposing interval of the exposing cycle so as to produce a sensed scene brightness signal; and, directing a source of infrared radiation at the infrared sensing means in response to the sensed scene brightness signal for a duration and time period which provides correct exposure during the exposing interval.

In another embodiment, provision is made for an exposure control accessory for use in combination with the photographic apparatus having an exposure control means being operable for controlling the amount of scene light to a film unit at an image plane; wherein the exposure control means includes visible and infrared light sensing means; and, an artificial illumination means which is actuatable before exposure is terminated. The accessory comprises housing means adapted for positioning on the photographic apparatus, wherein the accessory housing means when mounted on the camera allows scene light to pass to the camera's visible light sensing means. The accessory includes means operable for sensing reflected visible scene brightness after a pulse of illumination by the artificial illumination means and for providing a signal representative of the reflected scene brightness. Included is means operable for providing a source of infrared spectral energy to the infrared sensing means; and, means responsive to the scene brightness signal for deriving a signal for controlling energization of the infrared source means to a preselected brightness level and for a controlled time period for controlling camera functions. In this regard, the camera functions include regulating exposure and focus during the film exposure interval.

In another illustrated embodiment there is provided an underwater photographic system comprising: an underwater housing assembly having means for allowing the passage of light therethrough; and, a photographic camera apparatus of the self-developing type housed in the underwater housing assembly. The apparatus housing assembly includes compartment means for storing and permitting viewing of successively exposed film units which are ejected from the camera into the compartment means. The photographic apparatus includes taking lens means, an exposure control opening, a viewfinder; shutter blade means operable between scene light blocking and unblocking conditions for defining an exposure interval; artificial illumination means; and, exposure control means operable for controlling the amount of scene light to a film unit at an exposure position; wherein the exposure control means includes visible and infrared sensing means. Included is a camera or exposure control accessory for use in combination with the photographic apparatus. The accessory comprises housing means adapted for mounting on the photographic apparatus, wherein the accessory housing means when mounted on the camera allows scene light to pass to the camera's visible light sensing means. The accessory includes means operable for sensing reflected visible scene brightness after a pulse of illumination by the artificial illumination means and for providing a signal representative of the reflected scene brightness. Included is means operable for providing a source of infrared spectral energy to the infrared sensing means; and, means responsive to the scene brightness signal for deriving a signal for controlling energization of the infrared source means to a preselected brightness level and for a controlled time period for regulating exposure and focus during the film exposure interval.

Among the objects of the invention are, therefore, the provision of an improved method of and apparatus for controlling camera functions, preferably, including exposure and focus especially underwater; the provision of an improved method of and apparatus usable in combination with a photographic apparatus of the self-developing type in underwater photography; the provision of an apparatus and method of the last noted type which does not require adjustments to the photographic apparatus; the provision of an apparatus and method which compensates for the attenuation by water of infrared spectral energy evaluated by an exposure control of the photographic apparatus; the provision of an apparatus and method whereby such compensation is achieved by providing a source of infrared spectral energy which is supplied to the camera's exposure control system; and, the provision of an apparatus and method whereby such compensation is achieved automatically in response to the measured reflected brightness from the scene which is illuminated by a flash apparatus.

3

Other objects and further scope of applicability of the present invention will become apparent after reading the detailed description thereof when taken in conjunction with the accompanying drawings in which like parts are designated by like reference numerals throughout the several views.

DETAILED DESCRIPTION

Figure 1:
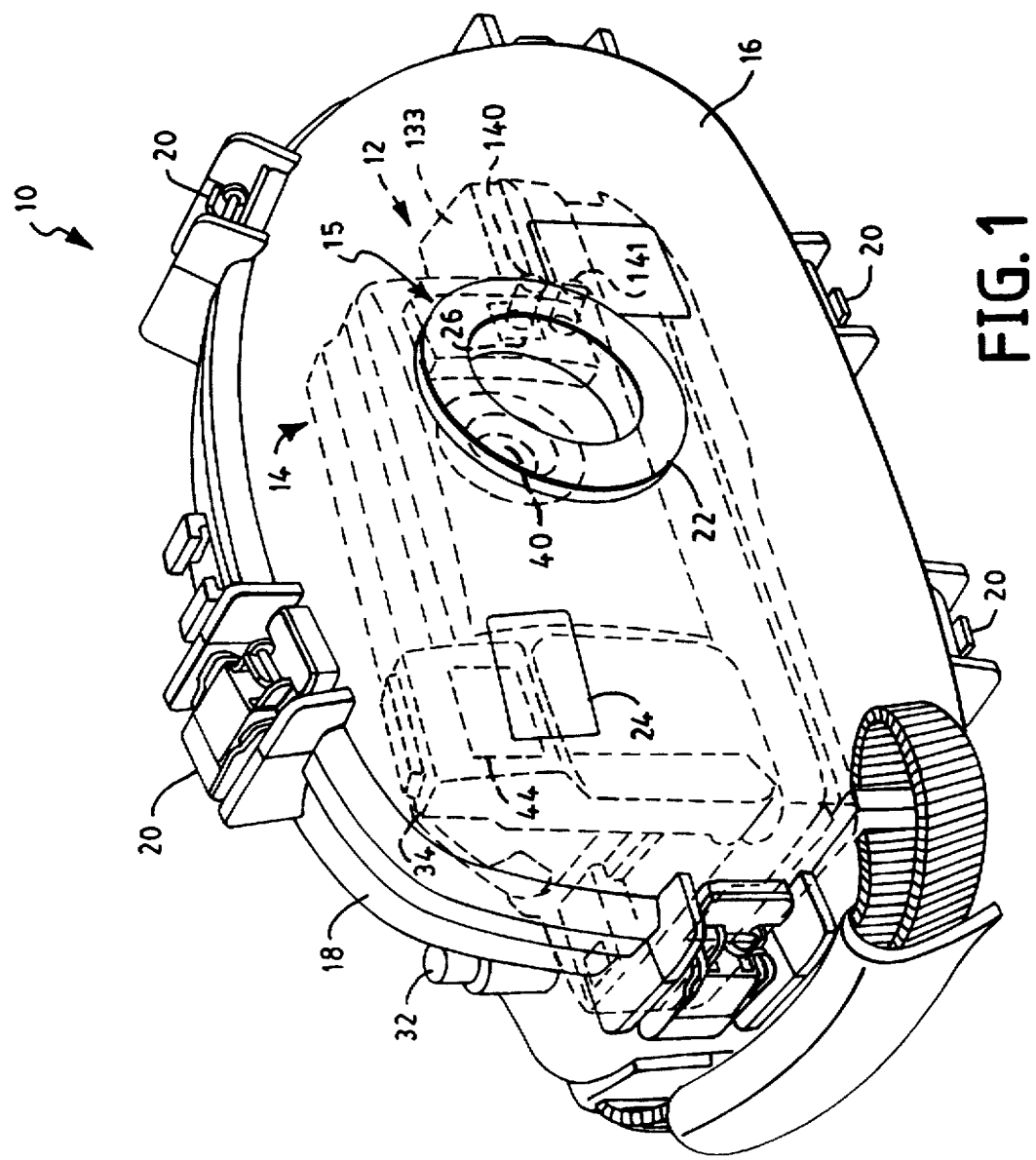
FIG. 1 is a perspective view illustrating a photographic system including a camera in phantom lines having mounted thereon an exposure control accessory housed in an underwater housing assembly.
Figure 3:
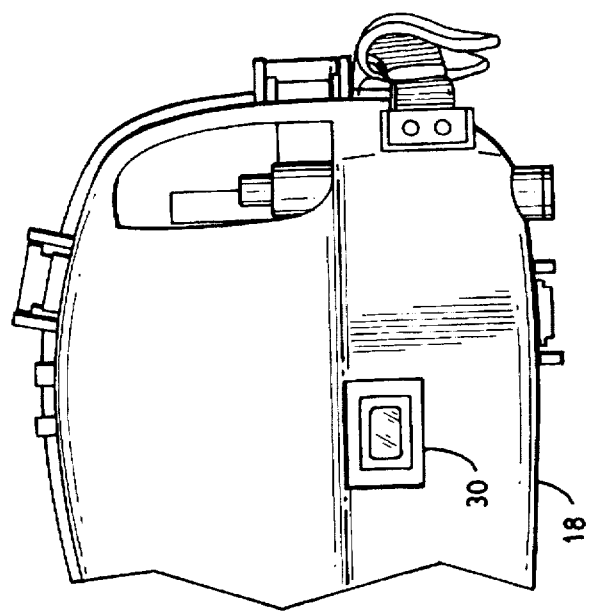
FIG. 3 is a back view of the underwater camera housing cover.
Figure 2:
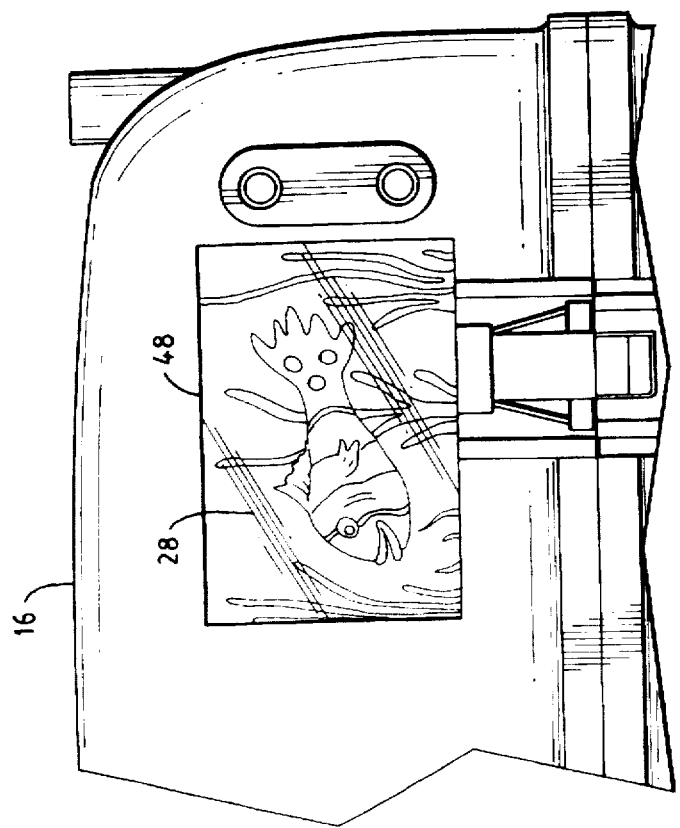
FIG. 2 is an enlarged fragmented view of a film unit viewing window in a front cover of the underwater housing.
Figure 4:
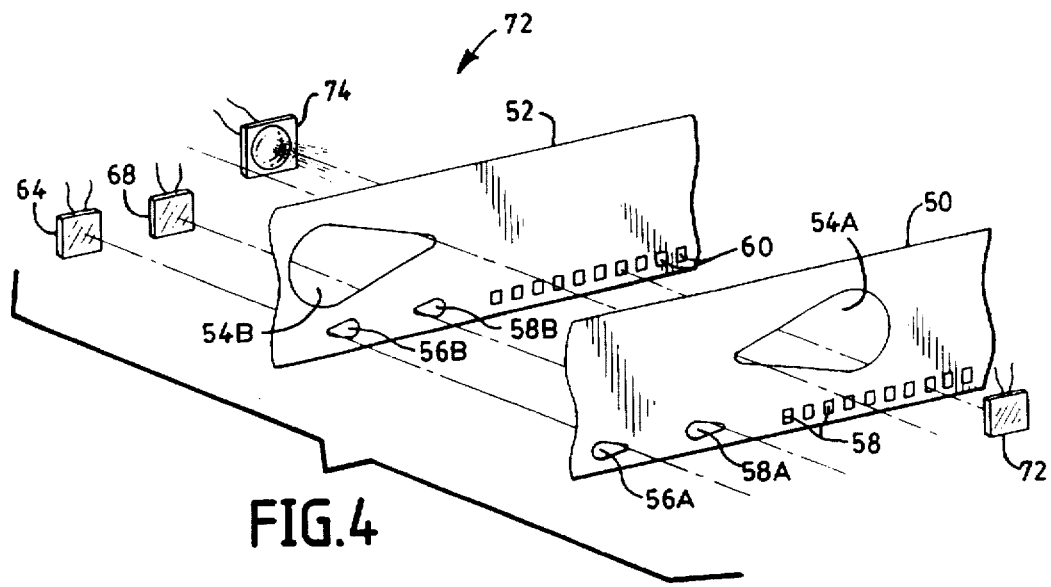
FIG. 4 is a diagrammatic exploded perspective view of a portion of the scanning type shutter blade mechanism in relationship to the exposure control system.
Figure 5:
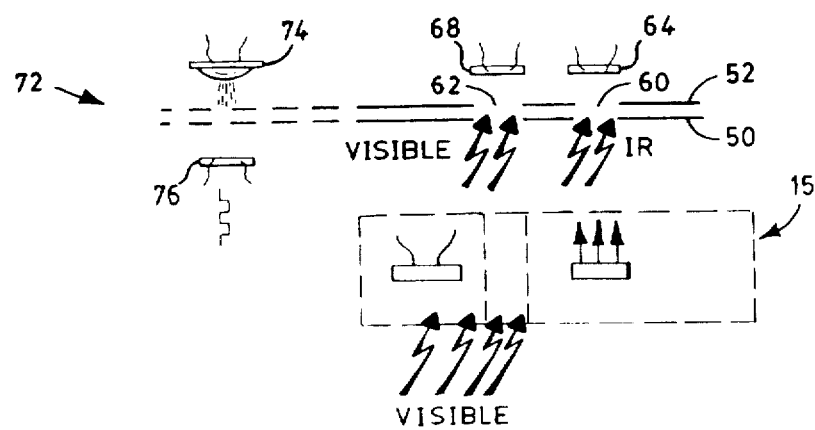
FIG. 5 is a diagrammatic view of a portion of the shutter blade mechanism and exposure control system of the present invention.

Initial reference is made to FIGS. 1-3 for illustrating one preferred embodiment of an underwater photographic system 10 made in according to the principles of the present invention. Essentially, the system 10 includes an underwater housing assembly 12 which releasably houses a camera 14 of the instant developing type. The system 10 includes an auxiliary exposure control device 15 which externally cooperates with the camera so that no changes need be made to the camera in order to achieve correct exposure and focus. The underwater housing assembly 12 includes a front cover assembly 16 and a back cover assembly 18 which are releasably held together by a plurality of fastener assemblies 20. The cover assemblies 16 and 18 when released allow insertion and removal of the camera 14 into and from the housing assembly. The cover assemblies 16 and 18 have internally walled surfaces (not shown) which securely and releasably hold the camera in an erect picture taking mode as illustrated. The underwater housing assembly 12 is known in the art and is commercially available from Polaroid Corporation. Details of the housing assembly 12 are thus known and do not form part of the present invention. Accordingly, only those features of the underwater housing necessary for understanding the present invention will be set forth. The front cover 16 includes an exposure taking window 22; a light source transmitting window 24; an exposure control window 26; and a film unit viewing window 28 (FIG. 2) on the bottom thereof. The back cover 18 includes a scene viewing window 30 aligned with the camera's viewfinder. A manually operable switch 32 protrudes from the back cover 18 and is in registry with an actuating switch on the camera. While this embodiment discloses the use of discrete windows, it will be appreciated that the housing assembly could be substantially made from a suitable transparent plastic material. For commencing an exposure cycle, a user depresses the switch 32 and thereby initiates actuation of the camera's actuating switch.

4

Figure 6:
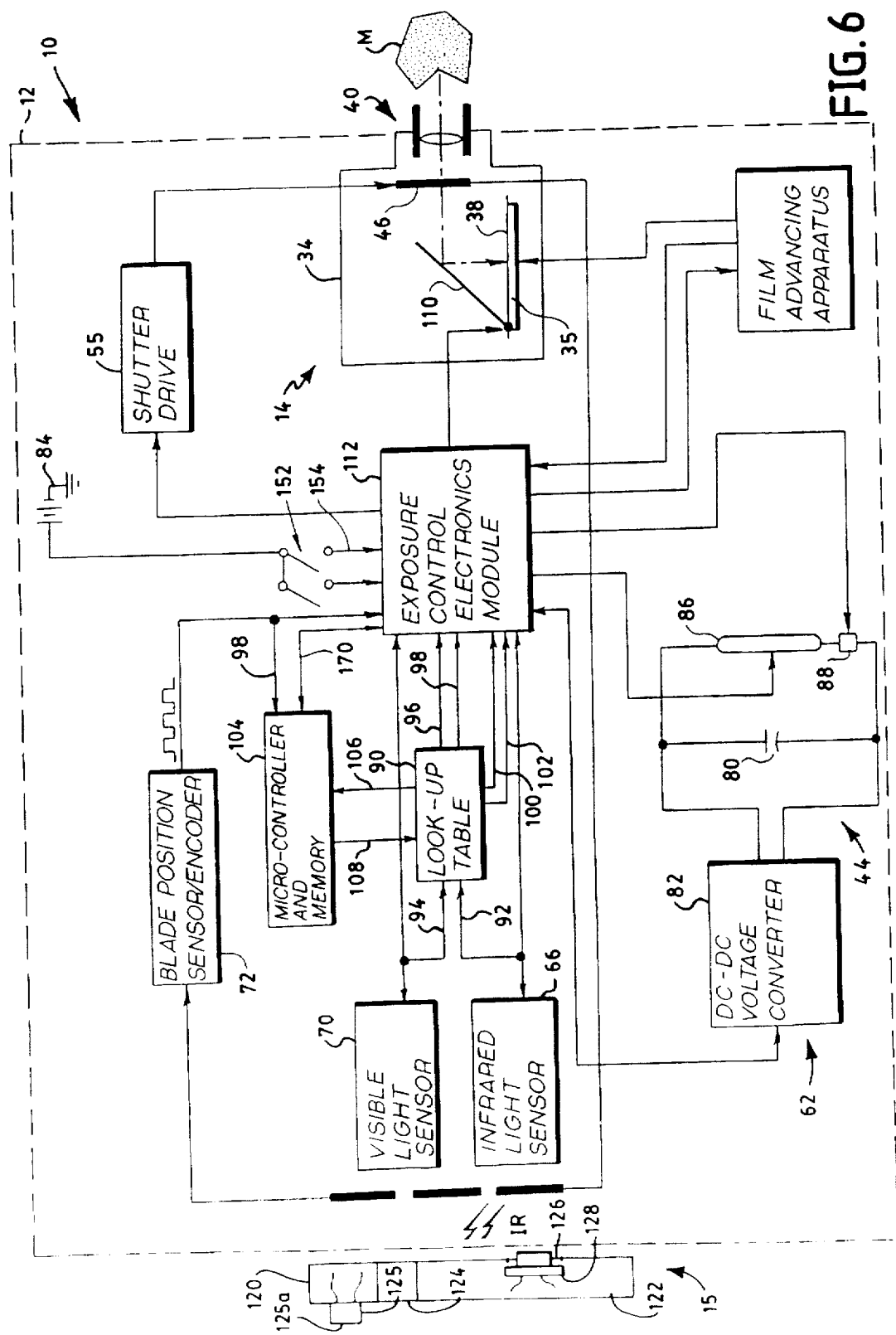
FIG. 6 is a block diagram of a control system of the present invention.

Continued reference is made to FIGS. 1 and 6 for illustrating one preferred embodiment of a single lens reflex (SLR) camera 14 of the instant type usable in connection with the underwater housing assembly 12. Exemplary of a single lens reflex camera having a displaceable or adjustable focus lens camera is described in commonly-assigned U.S. Pat. No. 4,799,077 to J. Kaplan et al. and is incorporated herein by reference. The camera 14 has a housing 34 having a compact folding construction and is operable to expose and process cassette-contained film (not shown), wherein the film is exposed at an image-plane 38. The housing 34 includes an objective or taking lens system 40 which can be of the variable focus type; exposure control openings 42; electronic flash apparatus 44; and, a shutter blade mechanism 46 intermediate the lens and the film. It will be appreciated that when the camera 14 is housed in the underwater housing assembly 12 there is registry between: the taking lens system 40 and the taking window 22; the flash window 24 and the flash apparatus 44; the exposure control window 26 and the exposure control openings 42; and, the exposed film window 28 and a film unit viewing window 48. The aligned windows 28 and 48 facilitate evaluation of the photograph while the user remains in the marine environment without the necessity of the user manipulating the film unit. The underwater camera housing 34 is provided with adequate structure for securely and properly mounting the camera in its erect or unfolded position without misalignment of the camera relative to the housing assembly. Such a camera of this type is commercially available under the trademark CAPTIVA model; manufactured by Polaroid Corporation, Cambridge, Mass., U.S.A. While the present embodiment of the system is intended for use with such a camera apparatus, it will be appreciated that the broader principles of the present invention encompass the utilization of other types of photographic cameras particularly of the instant-developing type. Because the auxiliary exposure control mechanism 15 interfaces externally with the camera 14 and does not require changes thereto, only those features necessary to understand the present invention will be set forth. For example, reference is made to commonly-assigned U.S. Pat. No. 5,014,082 to D. Farrington et al. for describing an exposure control system for which this invention is intended to be used and is incorporated herein by reference.

Reference is made to FIGS.1 and 4-6 for illustrating one embodiment of the camera 14. The taking lens system 40 focuses image-carrying light rays of, for example, a marine object M onto the image plane 38 through an aperture formed in the shutter blade mechanism or assembly 46. The shutter blade mechanism 46 includes a pair of infrared overlapping scanning shutter blade elements 50 and 52. Included in the blades 50 and 52 is a pair of scene light admitting primary apertures 54A, 54B; respectively. The primary apertures cooperate to define a progressive and predictable varying effective aperture in accordance with the longitudinal and lateral displacement of the blades relative to each other in a manner more fully described in commonly assigned U.S. Pat. No. 3,942,183 which is incorporated herein as a part hereof.

A shutter blade drive means 55 (FIG. 6) includes a tractive electromagnetic device in the form of a plunger solenoid and a control system for displacing the shutter blade elements 50, 52. Each of the blade elements 50 and 52 includes two pairs of secondary apertures 56A and 58A; and 56B and 58B. The pairs of apertures 56A; 56B; and 58A, 58B cooperate so that the former pair form an opening 60 through the shutter blades, while the latter pair form an opening 62 through the shutter blades. The cooperating secondary apertures track in a predetermined relationship with respect to the scene light admitting primary apertures 54A, 54B. The amount of artificial light admitted to the film plane through the primary apertures is controlled by a signal generated by a combination infrared photosensitive element 64 and integrator (not shown) within an infrared sensor 66 (FIG. 6) that senses and integrates a corresponding amount of infrared from the scene passing through the opening 60. The amount of visible light admitted to the image plane is controlled by a signal generated by a combination visible light photodiode 68 and an integrator (not shown) within a visible light sensor 70 (FIG. 6) that senses and integrates a corresponding amount of ambient light passing through the opening 62.

The camera 14 is provided with a blade position sensor/encoder system 72 which senses the position of the blade elements 50 and 52 with respect to one another and generates a signal representative of this relative position. The sensor/encoder 72 comprises a light emitting diode 74 and a photosensor 76 spaced therefrom as a single assembly 78.

Reference is now made back to the electronic flash apparatus 44. The flash apparatus 44 includes apparatus for its energization in order to determine subject reflectivity and to provide a portion of the exposure value required to illuminate a scene. In this regard, the flash apparatus 44 includes a main storage capacitor 80 which may be charged up to an operating voltage by any conventional voltage converter circuit (not shown) in a DC-DC voltage converter 82 which converts the DC voltage from the battery 84. A flash tube 86 and a thyristor 88 are connected in series and are collectively in parallel relation to the main capacitor 80. When energized the flash tube 86 illuminates the scene and subjects with both visible and infrared spectral frequencies. A look-up table 90 also generates additional empirically derived exposure control signals, the purpose of which is to control the amount of image-carrying scene light rays through the primary aperture in the shutter blade mechanism as a function of ambient scene light and of subject reflectivity. The amount of artificial and ambient scene light transmitted to the image plane 38 is indirectly measured by sensing a portion of the artificial and ambient or visible scene light through the openings 60 and 62 with the photosensor 64 and 68 and their associated integrators located within the infrared light sensor 66 and the visible light sensor 70; respectively. A signal generated by the infrared sensor 66 is routed to a lookup table 90 through a path 92 and a signal generated by the visible light detector 70 which is representative of ambient light is routed to the look-up table 90 through a path 94. The look-up table 90 generates a plurality of different signals in response to their two signals in response to a predetermined percentage of exposure size reference signals for controlling scene light through the primary apertures. These pluralities of different signals are derived for each exposure prior to an exposure interval. Alternatively, they can be derived at the early stages of the exposure interval.

The signals from the look-up table 90 are: (1) an aperture size signal on path 96 that controls the size of the taking aperture formed by the primary apertures 54A, 54B at which the flash tube 86 is fixed on a path 96; (2) a percentage of artificial light signals on path 98 that controls the amount of artificial light to be added by the flash tube; (3) an exposure aperture size reference signal on path 100 that controls the image-carrying light to the image-plane 38; and (4) a signal along path 102 to terminate the exposure interval at a time dependent upon the magnitude of the artificial and ambient light signals appearing on the input paths 92 and 94, respectively; if the exposure interval is not sooner terminated. It will be further understood that prior to generation of the noted look-up table output signals on the paths 96, 98, 100 and 102, the ambient light signal generated by the visible light sensor 70 is transmitted to a microcontroller 104 through a path 106 for temporary storage. Subsequent to the storage of this ambient light signal in the microcontroller 104 and prior to the start of an exposure interval, the artificial light reflected from a scene subject previously illuminated by a wink or short duration flash of light from the flash tube 86 is sensed by the infrared sensor 66 and a signal representative thereof is transmitted to the look-up table 90 through the path 92. The ambient light signal stored within the microcontroller 104 is transmitted to the look-up table through path 108. As a result, the stored ambient light signal, the infrared signal generated by the sensor 66 and the percentage of exposure aperture size reference signal are collectively employed within the look-up table 90. The signals appearing at the output path 96, 98, 100, 102 of the look-up table 90 in response to the artificial ambient scene light signals respectively generated by the sensors 66 and 70 and the percentage of exposure aperture size reference signals are empirically determined consistent with the teachings in U.S. Pat. No. 5,014,082.

In the exposure control system the source of artificial light generated by the flash tube 86 is employed to illuminate the scene with both visible and infrared. The flash tube 86 illuminates the scene twice during an exposure cycle-namely once before an exposure interval and once during the exposure interval. Both visible and infrared are employed during the exposure interval and the infrared is evaluated during the pre-exposure for exposure control immediately prior to or even at an early stage of the exposure control interval. By firing the flash tube 86 twice and utilizing the infrared portion of the illumination generated thereby in the determination of subject reflectivity before an exposure interval, only a single source of illumination is required. The pre-exposure and exposure intervals could be provided with two light sources; wherein one could be provided by the flash tube 86 to generate both visible and infrared and would be employed during the exposure interval. The other source would only have to emit infrared prior to an exposure interval and therefore, for example, an infrared emitting diode could be employed for such purposes.

Referring back to the camera 14, as noted it is of the SLR type and includes a reflex mirror 110 of the conventional type that is actuated by the exposure control electronics module 112 between a viewing position where it blocks the transmission of scene light to the film plane so that the operator can view the scene; and an unblocking position (FIG. 1) where it reflects scene light to the film plane during exposure.

In attempting to solve the problem of overexposure, as noted above, it was discovered that water absorbs significant amounts of infrared radiation. In fact, it was discovered that even as little as two feet of water attenuates practically all the infrared content from the flash tube 86. It will, therefore, be appreciated that such an absorption will adversely affect the exposure control evaluation as noted above since the latter relies on infrared. In this latter regard, the infrared sensor evaluates the scene as if the subject were at a remote distance and therefore signals the expose control module to terminate the exposure interval at a latter point in time. This would have the effect of overexposing those scenes in which the subject was nearer than the remote or infinity location which such a diminished scene evaluation would indicate. For example, these drawbacks are obviously undesirable particularly with close-up subject exposures.

The present invention addresses the issue by compensating for the diminished reflected infrared scene content by applying a predetermined amount of infrared energy directly to the infrared sensor of the camera's exposure system during the pre-exposure interval. The infrared energy is supplied in an amount and for a duration which compensates for the reduction in infrared absorbed by the water.

Figure 7:
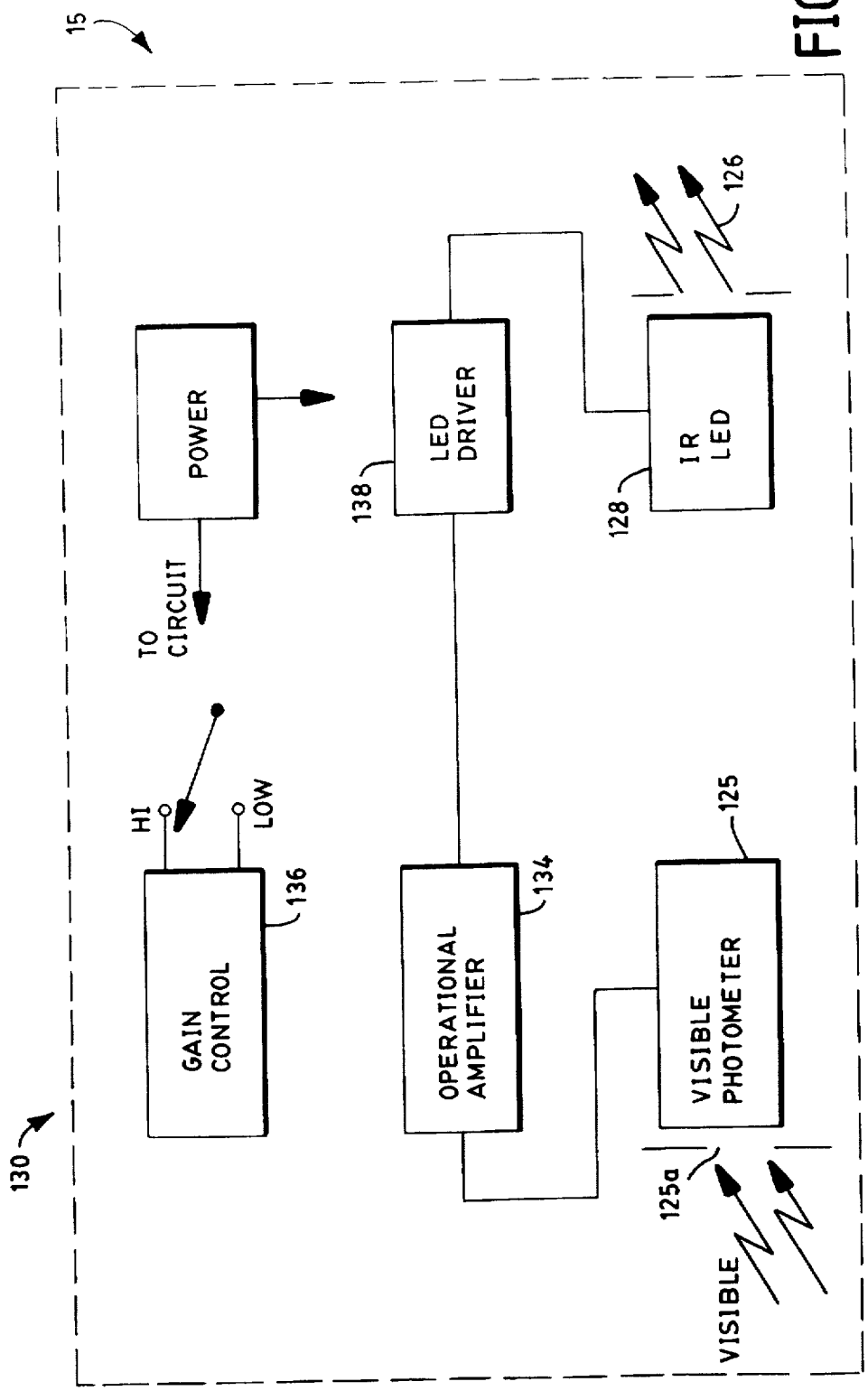
FIG. 7 is a block diagram of a circuit of the auxiliary exposure control system of the present invention; and, FIG. 7A is a diagrammatic view illustrating the auxiliary exposure control system mounted on a face of a camera.

FIGS. 6 and 7 illustrate one embodiment of an exposure control accessory or module 15 usable in conjunction with the underwater system for correcting for exposure of the camera during underwater photography. The exposure control accessory 15 includes a housing assembly 122 having a parallelepiped construction that is, preferably, mounted in a recess (not shown) formed in the front cover 16 so that the housing assembly 122 is placed over the exposure control opening 42 when the front cover 16 is in its assembled condition. The module housing 122 includes an aperture 124 that is in optical alignment or registry with the exposure control window 26 for allowing scene light and reflected light from the subject to pass to the visible light sensor 70. There is provided a photosensitive element 125 which in this embodiment is a silicon photodiode. The photosensitive element 125 is arranged to accept visible scene light through an opening 125a in the housing. A second or infrared module aperture 126 is in optical registry with the window 26 for allowing infrared spectral energy to be transmitted from a source of infrared spectral energy 128, such as an infrared emitting diode (IRED) located in the module housing 122. The infrared emitting diode 128 when energized pulses infrared through the housing aperture 126 to the infrared photosensor 66. In this arrangement, of course, the infrared-emitting diode 128 is within the acceptance angle of the camera's infrared photodiode 68. The operation of the infrared emitting diode 128 is controlled by the auxiliary exposure control circuit 130 (FIG. 7) for directing infrared energy in an amount and for a duration which compensates for the infrared that is determined to be absorbed by the water. The auxiliary exposure control circuit 130 is preferably located within the housing 122 and includes a PC board 132 and its own source of power being a battery pack 133, mounted on the camera and being coupled to the circuit by a cable (not shown).

Figure 7A:
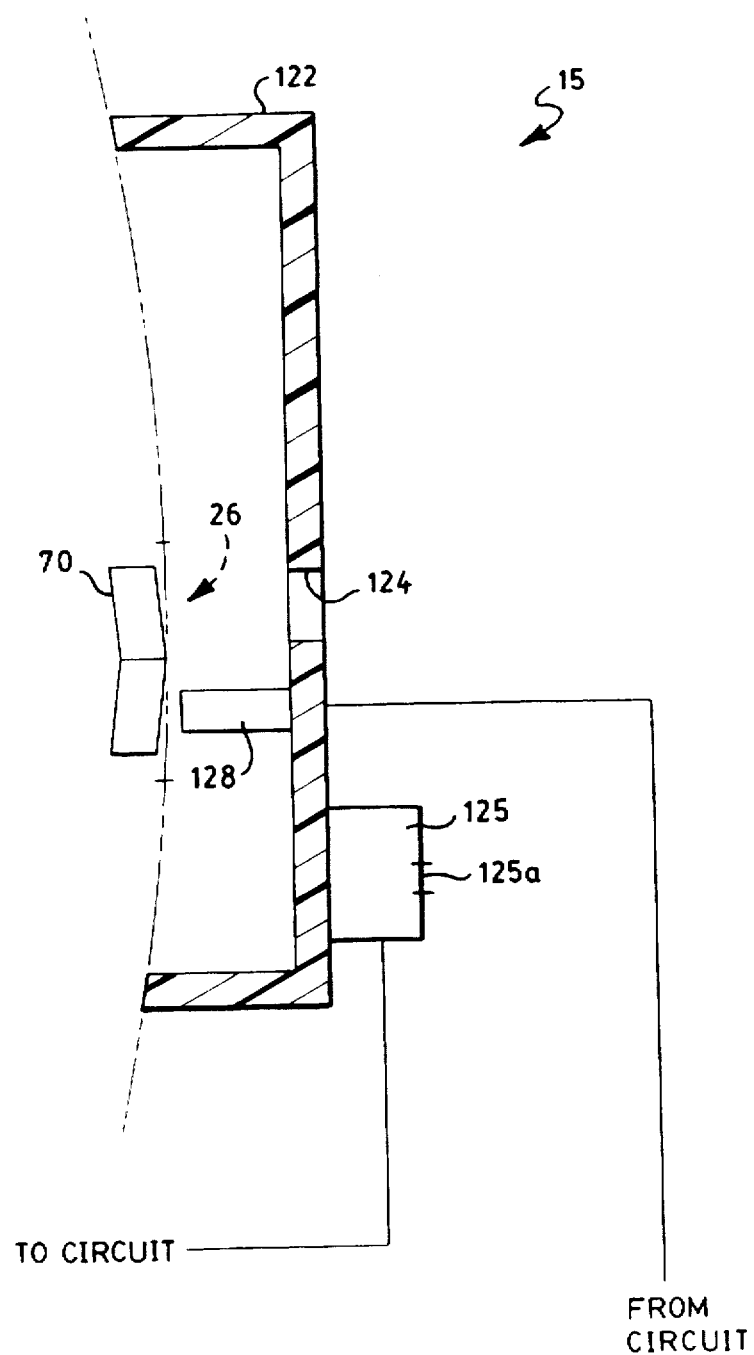

FIG. 7A illustrates a different preferred embodiment of the housing assembly 122'. In this embodiment, there is no internal wall contacting the camera. Rather, the housing has a shell configuration which is mounted on the camera face, with the infrared diode 128' directly opposite the infrared sensor 68.

As will be seen in the circuit of FIG. 7, the output of the visible photometer is directed to an operational amplifier 134 which is under the control of a gain control circuit 136. In this embodiment, the operational amplifier is a current-to-voltage transimpedence amplifier. The resulting signal from the operational amplifier 134 is transmitted to a coupled constant current drive circuit 138. The gain control circuit 136 in this embodiment includes a pair of resistors (not shown). It will be appreciated that there can be other multiple gain settings if desired. In the case of a pair of resistors, one could provide a relatively high gain, while the other a relatively lower gain. With a pair of resistors the difference in the values of the resistors could be approximately equal to about one-half stop in the exposure. A gain selection means, such as the manual switch 140 can be provided so that an operator can select from the exterior which gain setting would be preferred under the exposure circumstances. Also, a power on switch 141 is connected to the housing. A higher gain will tend to cause the exposure interval to terminate earlier than a lower gain setting. An automatic gain selection feature, not shown, is envisioned for use in the system. Also, a single gain is also contemplated since there is no need for the use of an automatic circuit to determine which gain is to be used under different scene lighting conditions. The switch 140 is actuatable from the housing 12. Which ever gain arrangement is used however, it will be appreciated that the gain control circuit 136 controls the operational amplifier 134. It does so as to generate a predetermined signal which is transmitted to the RED driver circuit 138 for controlling the amplitude and duration of the IRED 128. The IRED driver circuit 138 converts the signal from the operational amplifier 134 into a constant current pulse for driving the infrared-emitting diode 128. The driver circuit 138 is responsive to this current for pulsing the infrared-emitting diode 128 by an amount and for a duration determined by the measured visible light detected from the scene during the first or pre-exposure pulse of the flash tube 86. The amount of infrared which is emitted to the camera's infrared photodiode is preferred to be proportional to the amount of infrared which would appear in a scene if the subject were at such a distance from the camera and not underwater. This pulsing amounts therefore to the expected infrared absorption based on the measured reflectivity of the subject from the camera. After having described the above construction, it is believed that its operation is self-evident. However, to supplement such description the following brief description is set forth.

In operation, a user depresses the switch 32 for commencing an exposure cycle. It will be understood that prior to an exposure cycle, the primary or taking apertures 54A and 54B as well as the secondary apertures 56a and 56b are normally in their fully open condition. With reference to FIG. 6, actuation of the switch 32 results in actuation of a camera switch 152. This initiates the exposure cycle and enables the exposure control electronic module 112 through a path 154. The blade opening 62 is in its fully open position and actuation of the switch 152 causes the integrator within the camera's visible light sensor 70 to integrate ambient scene light for a fixed period of time. It will be appreciated that the scene light passes to the visible light sensors through the aperture 124 of the exposure control accessory 15. The integrated value is then sent to the look-up table 90 and then to the microcontroller 104. While this is occurring the reflex mirror 110 is in its viewing or light blocking condition and the flash apparatus is energized and ready for initiation of the exposure cycle. Subsequently, the shutter drive circuit 55 is driven to the aperture closed condition. Prior to initiation of an exposure at the film plane, the microcontroller causes the shutter drive mechanism 55 to increase the size of the apertures to its light blocking mode to its light unblocking mode; whereby image-carrying light is transmitted to the image or film plane 38 during an exposure interval. The microcontroller triggers the flash tube 86 and thereby illuminates the scene to be photographed with both visible and infrared. As noted this occurs prior to commencement of a film exposure interval. After a preselected interval, such as thirty-five-microseconds, this wink pulse or preevaluation flash is quenched. The infrared sensor 66 is also activated to sense the subject reflectivity signal reflected from the wink pulse as well as the inherent infrared appearing in the scene. However, instead of sensing the actual scene light it will sense and integrate the infrared emitted by the exposure control accessory 15. In this regard, during this initial or wink evaluation period, the ambient scene light and reflected scene brightness will not be sensed by the camera, but it will be sensed by the photodiode 125 in the accessory. The sensed reflected subject and scene reflected light is forwarded to the operational amplifier 134 which provides a signal representative of the reflected scene brightness. The operational amplifier which is under the control of the gain control circuit 136 derives a signal which controls energization of the IRED 128 to a preselected brightness level and for a controlled time period for regulating exposure during the film exposure interval. Specifically, the infrared emitting diode 128 is energized at an intensity and for a predetermined time period (e.g., the full extent of the preevaluation wink period—namely thirty-five microseconds). The camera's infrared sensor 66 then integrates this artificial infrared energy as if it were the reflected infrared coming from the scene after being pulsed by the flash. The camera's exposure control system as explained above will then control exposure and the other camera functions including focus so that they will operate consistent with the operation of such a self-developing camera.

While the foregoing embodiment has shown the auxiliary exposure control accessory 15 nested in an opening in the front cover, the present invention envisions the use of the accessory as being mountable on the camera housing 34. While it is preferred not to alter the camera, the present invention also contemplates that the accessory circuit could be internalized within the camera rather than be mounted on the outside thereof.

What is claimed is:

1. An underwater photographic system comprising:

an underwater housing assembly having visible light transmission means for allowing the passage of light therethrough;

a photographic apparatus of the self-developing type housed in said underwater housing assembly and being operable for ejecting developed film units into compartment means of said photographic apparatus for storing and permitting viewing of successively ejected film units; said photographic apparatus including an artificial illumination means, an exposure opening means, and exposure control means in optical communication with said opening means and being operable for controlling the amount of scene light to a film unit at an exposure position in said apparatus; said exposure control means including an infrared sensing means and a visible light sensing means wherein said illumination and sensing means are operable for controlling exposure of the film unit; and, an exposure control accessory for use in combination with said photographic apparatus, said accessory comprising housing means adapted for mounting on said photographic apparatus, said accessory housing means when mounted allowing scene light to pass to the visible light sensing means through said exposure opening; means operable for sensing reflected visible scene brightness after a pulse of illumination by said artificial illumination means and for providing a signal representative of the reflected scene brightness; means operable for providing a source of infrared spectral energy to said infrared sensing means; and, exposure means responsive to said scene brightness signal for deriving a signal for controlling energization of said infrared source means to a preselected brightness level and for a controlled time period which compensate for reduction of infrared absorbed by water for regulating exposure of said exposure control means for controlling exposure of said photographic apparatus.

2. A control accessory for use in combination with a photographic apparatus having artificial illumination means and an exposure control means including an infrared sensing means and a visible light sensing means which illumination and sensing means are operable for controlling exposure of a film unit in the photographic apparatus; said accessory comprising: housing means adapted for mounting on the photographic apparatus, said housing means when mounted allowing scene light to pass to the visible light sensing means; means operable for sensing reflected visible scene brightness after a pulse of illumination by the artificial illumination means and for providing a signal representative of the reflected scene brightness; source means operable for providing infrared spectral energy to the infrared sensing means; and, means responsive to said scene brightness signal for deriving a signal for controlling energization of the infrared source means to a preselected brightness level and for a controlled time period which compensates for reduction of infrared by water for regulating exposure of the exposure control means of the photographic apparatus.

3. An exposure control accessory for use in combination with a photographic apparatus having artificial illumination means and an exposure control means including an infrared sensing means and a visible light sensing means which illumination and sensing means are operable for controlling exposure of a film unit in the photographic apparatus; said accessory comprising: housing means adapted for mounting on the photographic apparatus, said housing means when mounted allowing scene light to pass to the visible light sensing means; means operable for sensing reflected visible scene brightness after a pulse of illumination by the artificial illumination means and for providing a signal representative of the reflected scene brightness; source means operable for providing infrared spectral energy to the infrared sensing means; and, means responsive to said scene brightness signal for deriving a signal for controlling energization of the infrared source means to a preselected brightness level and for a controlled time period for regulating functions of the photographic apparatus wherein said signal compensates for the reduction of infrared absorbed by water.

4. The exposure control accessory of claim 3 wherein said housing means is adapted to be received within an underwater housing assembly so as to be in operative relationship to the visible light and infrared sensing means of the photographic apparatus.

5. The exposure control accessory of claim 4 wherein said controlling means includes selection means operable for adjusting the energization of said infrared source means.

6. The exposure control accessory of claim 5 wherein said selection means includes a manually operable switch which is switchable between high or light and low or dark gain settings.

7. A method of exposing film underwater using a photographic apparatus of the self-developing type having a source of artificial illumination and an exposure control mechanism including an infrared sensing means wherein infrared content in a scene is used for controlling exposure; said method comprising the steps of: initiating an exposure cycle; evaluating the reflected scene brightness of a pulse of artificial illumination prior to completion of an exposure interval of said cycle in order to provide a signal representative thereof; and, directing a source of infrared radiation at the infrared sensing means in response to the sensed scene brightness signal in an amount and for a controlled time period which compensates for the reduction in infrared absorbed by water and thereby provides for a correct exposure by the exposure control mechanism during the exposure interval.

8. A method of exposing film underwater using a photographic apparatus of the self-developing type having a source of artificial illumination and an exposure control mechanism including an infrared sensing means wherein infrared content in a scene is used for controlling exposure; said method comprising the steps of: initiating an exposure cycle; evaluating the reflected scene brightness of a pulse of artificial illumination prior to completion of an exposure interval of said cycle in order to provide a signal representative thereof; and, directing a source of infrared radiation at the infrared sensing means in response to the sensed scene brightness signal in an amount and for a controlled time period which compensates for the reduction in infrared absorbed by water and thereby controls functions of the apparatus.

9. The method of claim 8 wherein the step of directing infrared radiation for a duration and controlled time period is for controlling exposure and focus.

10. An underwater photographic system comprising:

an underwater housing assembly having visible light transmission means for allowing the passage of light therethrough;

a photographic apparatus of the self-developing type housed in said underwater housing assembly and being operable for ejecting developed film units; said photographic apparatus including an artificial illumination means, an exposure opening means, and exposure control means in optical communication with said opening means and being operable for controlling the amount of scene light to a film unit at an exposure position in said apparatus; said exposure control means including an infrared sensing means and a visible light sensing means wherein said illumination and sensing means are operable for controlling exposure of the film unit; and, a control accessory for use in combination with said photographic apparatus, said accessory comprising housing means adapted for mounting on said photographic apparatus, said accessory housing means when mounted allowing scene light to pass to the visible light sensing means through said exposure opening; means operable for sensing reflected visible scene brightness after a pulse of illumination by said artificial illumination means and for providing a signal representative of the reflected scene brightness; means operable for providing a source of infrared spectral energy to said infrared sensing means; and, means responsive to said scene brightness signal for deriving a signal for controlling energization of said infrared source means to a preselected brightness level and for a controlled time period which compensates for the reduction in infrared absorbed by water and for regulating functions of said photographic apparatus including controlling exposure and focus.

* * * * *